(12) United States Patent
Gao et al.

(10) Patent No.: US 12,372,423 B2
(45) Date of Patent: Jul. 29, 2025

(54) GLOBAL PRESSURE ACQUISITION SYSTEM AND METHOD FOR ROTATING MODEL

(71) Applicant: NORTHWESTERN POLYTECHNICAL UNIVERSITY, Shaanxi (CN)

(72) Inventors: Limin Gao, Shaanxi (CN); Ning Ge, Shaanxi (CN); Lei Wang, Shaanxi (CN); Bo Ouyang, Shaanxi (CN); Xiangfu Lei, Shaanxi (CN)

(73) Assignee: NORTHWESTERN POLYTECHNICAL UNIVERSITY, Shaanxi (CN)

( * ) Notice: Subject to any disclaimer, the term of this patent is extended or adjusted under 35 U.S.C. 154(b) by 313 days.

(21) Appl. No.: 18/181,567

(22) Filed: Mar. 10, 2023

(65) Prior Publication Data

US 2024/0118148 A1  Apr. 11, 2024

(30) Foreign Application Priority Data

Oct. 9, 2022  (CN) .......................... 202211231258.3

(51) Int. Cl.
*G01L 1/24*  (2006.01)
(52) U.S. Cl.
CPC ..................................... *G01L 1/24* (2013.01)

(58) Field of Classification Search
CPC ........................................................ G01L 1/24
USPC ............................................................ 73/760
See application file for complete search history.

(56) References Cited

FOREIGN PATENT DOCUMENTS

| CA | 2204980 A1 | * | 5/1997 | |
|----|------------|---|--------|---|
| CN | 111174958 B | * | 9/2021 | ........... G01L 5/0061 |
| CN | 217276041 U | * | 8/2022 | ............. G01B 11/16 |

OTHER PUBLICATIONS

Translation of CN-217276041-U (Year: 2022).*
Translation of CN-111174958-B (Year: 2021).*

* cited by examiner

*Primary Examiner* — Nathaniel T Woodward
(74) *Attorney, Agent, or Firm* — JCIPRNET

(57) ABSTRACT

The disclosure discloses a global pressure acquisition system for a rotating model, including a CCD camera, a signal generator, a stroboscopic pulse LED light source, a photoelectric sensor, a preset counter, and a controller. The disclosure further discloses a global pressure acquisition method for a rotating model. The disclosure has the beneficial effects that, by using the non-contact measuring method disclosed by the present disclosure, a measured model and a flow field are not damaged, a submillimeter-level spatial resolution is achieved, it is ensured that the acquired PSP image of the rotating model is clear, and the signal to noise ratio of the image is increased.

6 Claims, 2 Drawing Sheets

GLOBAL PRESSURE ACQUISITION SYSTEM AND METHOD FOR ROTATING MODEL

CROSS-REFERENCE TO RELATED APPLICATION

This application claims the priority benefit of China application no. 202211231258.3, filed on Oct. 9, 2022. The entirety of the above-mentioned patent application is hereby incorporated by reference and made a part of this specification.

FIELD

The present disclosure relates to the technical field of instruments and apparatuses, in particular to a global pressure acquisition system and method for a rotating model.

BACKGROUND

As one of three thermotechnical parameters (pressure, temperature and flow) of automatic control, the pressure plays a very important role in measurement and control. However, pressure measurement applied to a rotating model has great difficulty in terms of rotary balance, data transmission, experimental safety, etc.

The research on an optical pressure measurement with PSP (Pressure Sensitive Paint) based on computer vision and image processing technologies is an important breakthrough in a non-contact flow visualization technology. Compared with the current domestic traditional dot matrix measurement technology, the optical pressure measurement with PSP can make up the damage to the model and the interference to flow fields caused by hole arrangement of pressure probes, a pressure sensor, or the like, and the complexity of the traditional data transmission method. Moreover, this measurement can greatly widen the measurement range, and has the advantages of no contact, continuous measurement, relatively low experimental cost and time saving, which is popular to the majority of experimental workers.

The basic principle of the optical pressure measurement with PSP is as follows: PSP uniformly covers a surface of a measured model, and PSP includes photosensitive molecules and an oxygen-permeable substrate. When being excited by light with a specific wavelength, the photosensitive molecules in the paint get energy from the originally stable ground state so as to be transitioned to a high-energy-level excited state. The photosensitive molecules in the unstable excited state are impacted by the oxygen molecules diffused from the measured surface to lose the energy in the excited state so as to be deactivated to return to the ground state, and no radiant light is generated in this process, so that the light emitting intensity is lowered, resulting in an "oxygen quenching" phenomenon. The higher the concentration of the oxygen molecules, i.e., the higher the pressure in the atmosphere, the stronger the oxygen quenching effect, and the darker the light emitted by the paint under the irradiation of certain light. Therefore, under the irradiation of the light, the light emitting intensity of PSP can reflect a value of the pressure on the surface of the measured model. An image on the surface of the measured model is shot under the irradiation of the light, and by analyzing the shot image, pressure distribution on the surface of the measured model can be obtained, and a new thought is also provided for measuring the pressure distribution on the surface of the rotating model.

Although the optical pressure measurement with PSP has great potential in application to the rotating model, it also conflicts with the acquisition of an optical pressure sensitive experimental image of the rotating model: not only is it desired to increase the signal to noise ratio of a PSP image by prolonging exposure time, but also the motion blur of the image has to be reduced by shortening the exposure time.

Therefore, it is necessary to design a set of global pressure acquisition system for a rotating model to acquire a PSP image of the rotating model at a high signal to noise ratio and a low blur level.

SUMMARY

The present disclosure aims at overcoming defects in the prior art to provide a global pressure acquisition system and method for a rotating model, by which a PSP image is clear and has a high signal to noise ratio.

The present disclosure adopts the technical solutions as follows: provided is a global pressure acquisition system for a rotating model, including a CCD camera, a signal generator, a stroboscopic pulse LED light source, a photoelectric sensor, a preset counter, and a controller.

PSP is uniformly sprayed in a measured area of the rotating model, and a reflective patch is pasted in a non-measured area of the rotating model rotating at the same speed.

The photoelectric sensor is disposed to face the rotating model and is connected to an input end of the signal generator. When the rotating model rotates to any to-be-measured phase, a light spot emitted by the photoelectric sensor is irradiated on the reflective patch, and is received by the photoelectric sensor after being reflected, and a signal is sent to trigger a channel A and a channel B of the signal generator to send signals.

The CCD camera carries a lens, and the lens is aligned with the rotating model and is capable of shooting a complete image of the rotating model. A bandpass filter only allowing a light emitting waveband of the PSP to pass through is mounted in front of the lens to prevent ambient light and light emitted by the light source from entering a photosensitive chip of the camera. The CCD camera is connected to a computer by a data connecting line, and the computer is used for controlling exposure time of the CCD camera. After being collected by the CCD camera, a light emitting signal of the PSP is photoelectrically converted and is transmitted to the computer by a data line to form a PSP image. An external triggering interface of the CCD camera is connected to the channel A of the signal generator, the signal generator sends a signal to the CCD camera via the channel A to control initial exposure time of the CCD camera, and the exposure time of the CCD camera is controlled by the computer.

The stroboscopic pulse LED light source is disposed to face the rotating model, and light emitted by the stroboscopic pulse LED light source is capable of covering a to-be-measured area. The stroboscopic pulse LED light source is connected to one end of a relay switch of the preset counter, and the other end of the relay switch of the preset counter is connected to the channel B of the signal generator. The channel B of the signal generator sends a signal to control the single pulsed light emitting time and light emitting frequency of the stroboscopic pulse LED light source.

The channels of the signal generator are connected to a counting end of the preset counter.

The present disclosure further provides a global pressure acquisition method for a rotating model, wherein the method includes the following steps:

step 1, providing the respective components of the above-mentioned global pressure acquisition system for the rotating model;

step 2, mounting the CCD camera and the stroboscopic pulse LED light source when the rotating model is in a static state;

step 3, setting the stroboscopic pulse LED light source to continuously emit light, shooting an image I1 of the to-be-measured area in the static state by using the CCD camera in an automatic triggering manner, taking the image I1 as a reference image, sending the image I1 to the computer, and recording exposure time T1 of the CCD camera at the moment by the computer;

step 4, turning on the photoelectric sensor, aligning the photoelectric sensor with the synchronously rotating non-measured area of the model, pasting the reflective patch to a model position where a light spot emitted by the photoelectric sensor reaches at the moment;

step 5, turning off the photoelectric sensor, adjusting the stroboscopic pulse LED light source to a modulated external triggering mode, sending a signal by the channel B of the signal generator to control the light emission of the stroboscopic pulse LED light source, and adjusting the CCD camera to the external triggering mode;

step 6, setting a signal pulse width t of the channel B of the signal generator, i.e., single light emitting time of the stroboscopic pulse LED light source, according to an experimental rotating speed n;

step 7, setting the number N of times of light emission of the stroboscopic pulse LED light source, setting the preset number of the preset counter to be N, and setting that exposure time T2 of the CCD camera is not shorter than the time during which the rotating model rotates for N circles;

step 8, turning on the rotating model, enabling a rotating speed of the rotating model to reach a measured rotating speed n, after the rotating model rotates to a phase in a static reference state, sending a triggering signal to the signal generator by the photoelectric sensor to control the CCD camera to start to expose and control the signal generator to trigger the stroboscopic pulse LED light source to start to emit light at the same time;

step 9, after blades of the rotating model rotate for N times, stopping the light emission of the stroboscopic pulse LED light source;

step 10, after the exposure time of the CCD camera reaches T2, outputting an experimental image I2 to the computer; and step 11, calculating a light intensity ratio of the two images, and calculating pressure distribution according to a light intensity-pressure calibration formula.

According to the above-mentioned solution, in step 2, when the CCD camera and the stroboscopic pulse LED light source are mounted, a position where the PSP is sprayed is adjusted so that the CCD camera is capable of shooting a complete area where the PSP is sprayed. A measuring distance of the stroboscopic pulse LED light source is adjusted so that the emitted light is capable of covering the complete to-be-measured area.

According to the above-mentioned solution, in step 7, the number N of times of light emission of the stroboscopic pulse LED light source satisfies N=T1/t, that is, the total light emitting time of the stroboscopic pulse LED light source in the experimental image is consistent with that of a static reference image.

According to the above-mentioned solution, in step 11, the light intensity-pressure calibration formula is expressed as:

$$I2/I1 = A + B \times P2/P1,$$

wherein P1 is an ambient pressure of the rotating model in a static state, P2 is a surface pressure of the rotating model in a motion state, and P1 and P2 are measured by a pressure sensor; and A and B are calibration coefficients which are constants.

According to the above-mentioned solution, the calibration coefficients A and B are acquired by using the following method: placing a sample wafer sprayed with a PSP in a pressure-adjustable cabin, adjusting the pressure in the cabin to P1, and acquiring a light emitting image Ic of the PSP at the moment by a camera; repeatedly adjusting the pressure P in the cabin, and capturing a corresponding light emitting image I by the camera; substituting repeatedly-acquired data into a calibration formula I/Ic=A+B×P/P1 to form binary linear equations with variables A and B; and calculating A and B by a least square method.

The present disclosure has the following beneficial effects: The non-contact measuring method disclosed by the present disclosure does not damage the measured model and the flow field. Each pixel on the shot PSP image represents a pressure probe, which has a submillimeter-level spatial resolution. The stroboscopic pulse LED light source with a short pulse stroboscopic function and high optical power stability is selected to excite the PSP, so that it is ensured that the shot PSP image of the rotating model is clear. The CCD camera with longer exposure time is selected to capture the light emission of the PSP, and the brightness of the image is improved in a manner of superposition of multiple short-time light emissions of the PSP, so that the signal to noise ratio of the image is increased. The total light emitting intensity in the static reference state needs to be the same as that in the high-speed experimental state as much as possible according to the requirements of the measurement with PSP, therefore, in the present disclosure, the total light emission quantity of the light source within the exposure time is controlled, the number of times of light emission of the light source is controlled by the preset counter, and then, the total light emitting time is calculated according to the single pulse light emitting time, which should be consistent with the light emitting time in the static reference state. The system disclosed by the present disclosure is simple in structure, high in stability and applicable to the measurement of a rotating model of which the rotating speed is 150 kr/min or below; the shot image is high in signal to noise ratio and low in blur level. The system can measure a rotating model of which the highest blade tip speed can reach 500 m/s. The system is insensitive to interference from the fluctuation of the rotating speed. The shot image does not need to be subjected to data processing in terms of image quality. Devices for forming the system are commonly-used instruments, without customization.

1, CCD camera; 2, lens; 3, bandpass filter; 4, stroboscopic pulse LED light source; 5, signal generator; 6, photoelectric sensor; 7, preset counter; 8, computer; 9, PSP, 10, reflective patch; and 11, rotating model.

DETAILED DESCRIPTION OF THE EMBODIMENTS

In order to better understand the present disclosure, the present disclosure will be further described below in conjunction with accompanying drawings and specific embodiments.

Figure 1:
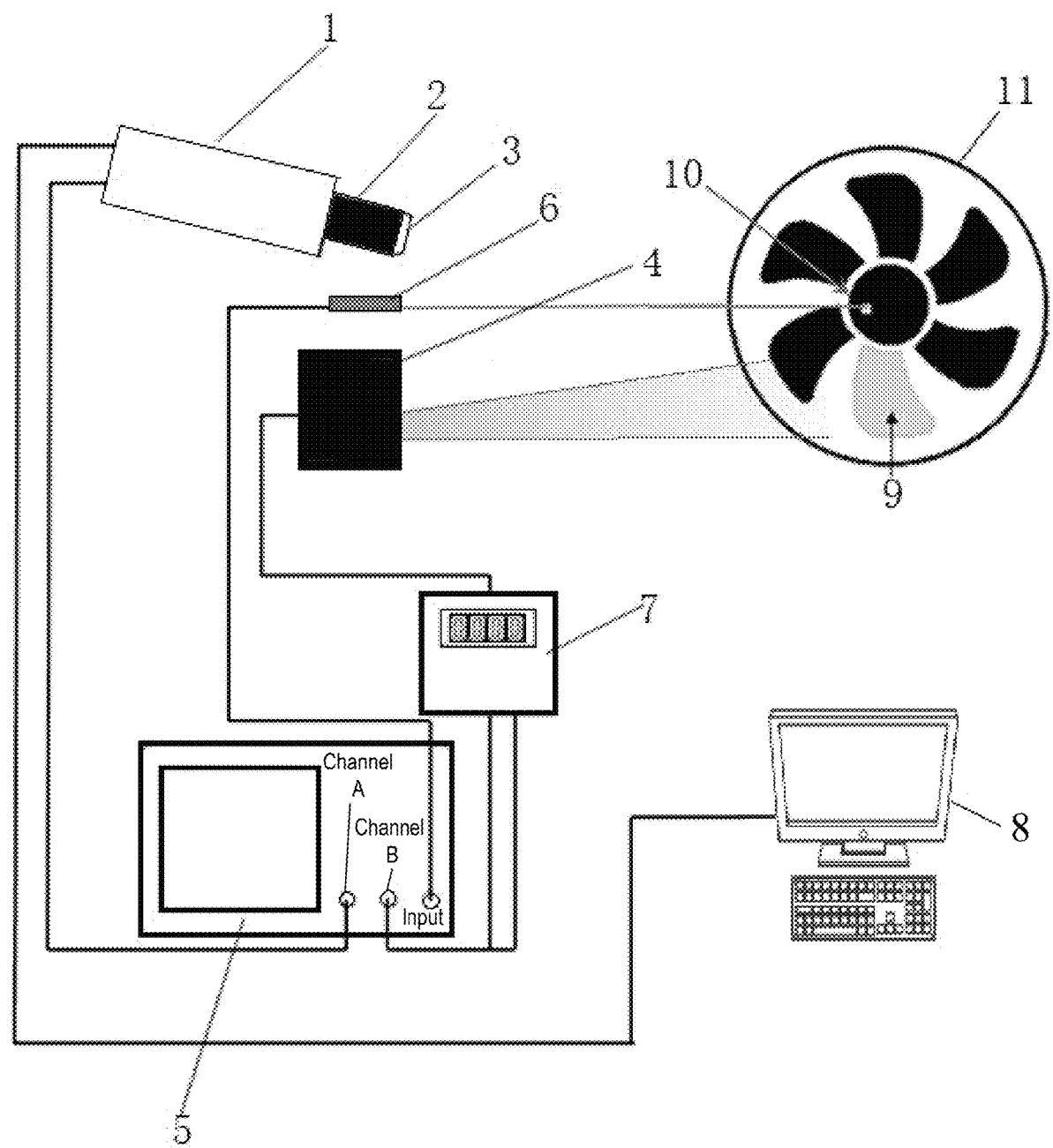
FIG. 1 is an overall structural schematic diagram of a specific embodiment of the present disclosure.

As shown in FIG. 1 which illustrates a global pressure acquisition system for a rotating model 11, The global pressure acquisition system includes a CCD camera 1, a signal generator 5, a stroboscopic pulse LED light source 4, a photoelectric sensor 6, a preset counter 7, and a controller.

Pressure sensitive paint (which is referred to as PSP 9 for short below) is uniformly sprayed in a measured area of a rotating model 11, and a reflective patch 10 is pasted in a non-measured area of the rotating model 11 rotating at the same speed;

the photoelectric sensor 6 is disposed to face the rotating model 11 and is connected to an input end of the signal generator 5. When the rotating model 11 rotates to any to-be-measured phase, a light spot emitted by the photoelectric sensor 6 is irradiated on the reflective patch 10, and is received by the photoelectric sensor 6 after being reflected, and a signal is sent to trigger a channel A and a channel B of the signal generator 5 to send signals.

The CCD camera 1 carries a lens 2, the lens 2 is aligned with the rotating model 11 and is capable of shooting a complete image of the rotating model 11. A bandpass filter 3 only allowing a light emitting waveband of the PSP 9 to pass through is mounted in front of the lens 2 to prevent ambient light and light emitted by the light source from entering a photosensitive chip of the camera. The CCD camera 1 is connected to a computer 8 by a data connecting line, and the computer 8 is used for controlling exposure time of the CCD camera 1. After being acquired by the CCD camera 1, a light emitting signal of the PSP is photoelectrically converted and is transmitted to the computer 8 by a data line to form a PSP image. An external triggering interface of the CCD camera 1 is connected to the channel A of the signal generator 5, the signal generator sends a signal to the CCD camera 1 via the channel A to control initial exposure time of the CCD camera 1, and the exposure time of the CCD camera 1 is controlled by the computer 8.

The stroboscopic pulse LED light source 4 is disposed to face the rotating model 11, and light emitted by the stroboscopic pulse LED light source 4 is capable of covering a to-be-measured area. The stroboscopic pulse LED light source 4 is connected to one end of a relay switch of the preset counter 7, and the other end of the relay switch of the preset counter 7 is connected to the channel B of the signal generator 5. The channel B of the signal generator 5 sends a signal to control the single pulsed light emitting time and light emitting frequency of the stroboscopic pulse LED light source 4.

The channel B of the signal generator 5 is connected to a counting end of the preset counter 7 to record the number of signals sent by the channel B. When a preset number is reached, the relay switches of the preset counter 7 are turned off to stop the light emission of the stroboscopic pulse LED light source 4.

A global pressure acquisition method for a rotating model includes the following steps.

Step 1: the respective components of the above-mentioned global pressure acquisition system for the rotating model 11 are provided.

Step 2: The CCD camera 1 and the stroboscopic pulse LED light source 4 are mounted when the rotating model 11 is in a static state, a position where the PSP 9 is sprayed is manually adjusted so that the CCD camera 1 is capable of shooting the complete area where the PSP 9 is sprayed, and a measuring distance of the stroboscopic pulse LED light source 4 is adjusted so that the emitted light is capable of covering the complete to-be-measured area.

Step 3: The stroboscopic pulse LED light source 4 is set to continuously emit light. The CCD camera 1 is used to shoot an image I1 of the to-be-measured area in a static state in an automatic triggering manner, and the image I1 is taken as a reference image and is sent to the computer 8. The computer 8 records exposure time T1 of the CCD camera 1 at the moment.

Figure 2:
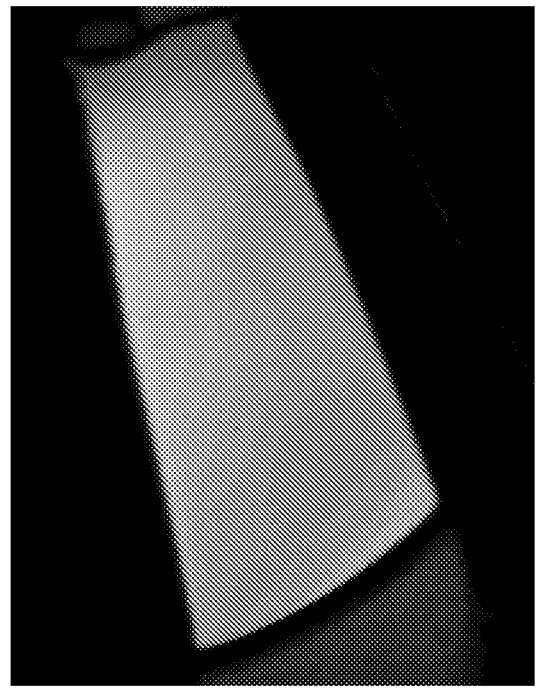
FIG. 2 is a schematic diagram of an image I1 in the present embodiment.

In the present embodiment, the experimental rotating speed is 2800 rpm, T1=23.52 ms, and the image I1 is as shown in FIG. 2.

Step 4: The photoelectric sensor 6 is turned on to be aligned with the synchronously rotating non-measured area of the model, and the reflective patch 10 is pasted to a model position where a light spot emitted by the photoelectric sensor 6 reaches at the moment. It is ensured that the photoelectric sensor 6 receives a signal reflected by the reflective patch 10 when the model rotates to this phase during rotation to achieve the phase locking of the rotating model 11.

Step 5: The photoelectric sensor 6 is turned off, and the stroboscopic pulse LED light source 4 is adjusted to a modulated external triggering mode. The channel B of the signal generator 5 sends a signal to control the light emission of the stroboscopic pulse LED light source, and the CCD camera 1 is adjusted to the external triggering mode.

Step 6: A signal pulse width t of the channel B of the signal generator 5, i.e., single light emitting time of the stroboscopic pulse LED light source, is set according to an experimental rotating speed n.

In the present embodiment, t=6 μs.

Step 7: The number N of times of light emission of the stroboscopic pulse LED light source 4 is set, the preset number of the preset counter 7 is set to be N, and the exposure time T2 of the CCD camera 1 is set to be not shorter than the time during which the rotating model 11 rotates for N circles (the stroboscopic pulse LED light source 4 emits light for N times). In order to ensure that the light intensity of the reference image is substantially similar to that of the experimental image to obtain pressure distribution with a high signal to noise ratio, the number N of times of light emission of the stroboscopic pulse LED light source 4 satisfies N=T1/t, that is, the total light emitting time of the stroboscopic pulse LED light source 4 in the experimental image is consistent with that of the static reference image.

In the present embodiment, N=3920.

Step 8: The rotating model 11 is turned on, and a rotating speed of the rotating model 11 is enabled to reach a measured rotating speed n. After the rotating model 11 rotates to a phase at which a static reference state is present, the photoelectric sensor 6 sends a triggering signal to the signal generator 5 to control the CCD camera 1 to start to expose and control the signal generator to trigger the stroboscopic pulse LED light source 4 to start to emit light at the same time.

Step 9, after blades of the rotating model 11 rotate for N times, the relay switches of the preset counter 7 are turned off, at the moment, a circuit between the signal generator 5 and the stroboscopic pulse LED light source 4 is an open circuit, and the stroboscopic pulse LED light source 4 stops emitting light.

Step 10: After the exposure time of the CCD camera 1 reaches T2, an experimental image I2 is output to the computer 8.

Figure 3:
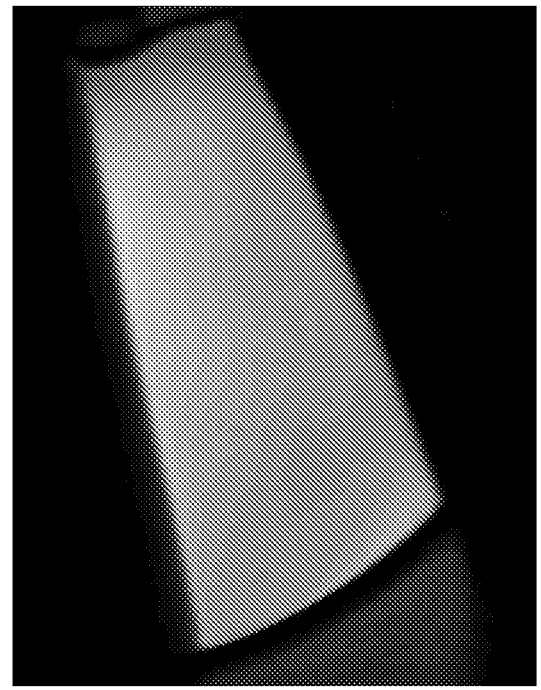
FIG. 3 is a schematic diagram of an image I2 in the present embodiment.

In the present embodiment, the image I2 is as shown in FIG. 3.

Step 11: A light intensity ratio of the two images is calculated, and pressure distribution is calculated by a light intensity-pressure calibration formula after experiment. The calibration formula is expressed as: $I2/I1=A+B\times P2/P1$, wherein P1 is an ambient pressure in a static state, and P2 is a surface pressure in a motion state. P1 and P2 are measured by a pressure sensor, and P2/P1 is a relative pressure. A and B are calibration coefficients, which are obtained by calibration.

A calibration method is that: a sample wafer sprayed with PSP 9 is placed in a pressure-adjustable cabin, the pressure in the cabin is adjusted to P1, and a light emitting image Ic of the PSP at the moment is acquired by using a camera; the pressure P in the cabin is repeatedly regulated, and a corresponding light emitting image I is captured by the camera; data acquired repeatedly is substituted into a calibration formula $I/Ic=A+B\times P/P1$ to form binary linear equations with variables A and B; A and B are calculated by a least square method; and the pressure P2 in a rotating state is calculated according to $I2/I1=A+B\times P2/P1$.

Finally, it should be noted that the above-mentioned embodiments are merely preferred embodiments of the present disclosure, but are not intended to limit the present disclosure. Although the present disclosure has been described in detail with reference to the embodiments, those skilled in the art may still modify the technical solutions recorded in the respective foregoing embodiments or equivalently substitute parts of technical features therein. Any modifications, equivalent substitutions, improvements, etc., made within the spirit and principle of the present disclosure shall fall within the protection scope of the present disclosure.

What is claimed is:

1. A global pressure acquisition system for a rotating model, comprising a CCD camera, a signal generator, a stroboscopic pulse LED light source, a photoelectric sensor, a preset counter, and a controller, wherein the global pressure acquisition system is configured such that:

PSP is sprayed in a measured area of the rotating model, and a reflective patch is pasted in a non-measured area of the rotating model rotating at the same speed;

the photoelectric sensor is disposed to face the rotating model and is connected to an input end of the signal generator; when the rotating model rotates to any to-be-measured phase, a light spot emitted by the photoelectric sensor is irradiated on the reflective patch, and is received by the photoelectric sensor after being reflected, and a signal is sent to trigger a channel A and a channel B of the signal generator to send signals;

the CCD camera carries a lens, the lens is aligned with the rotating model and is capable of shooting a complete image of the rotating model, and a bandpass filter only allowing a light emitting waveband of the PSP to pass through is mounted in front of the lens to prevent ambient light and light emitted by the light source from entering a photosensitive chip of the CCD camera; the CCD camera is connected to a computer by a data connecting line, and the computer is used for controlling an exposure time of the CCD camera; after being acquired by the CCD camera, a light emitting signal of the PSP is photoelectrically converted and is sent to the computer by the data line to form a PSP image; and an external triggering interface of the CCD camera is connected to the channel A of the signal generator, the signal generator sends a signal to the CCD camera via the channel A to control initial exposure time of the CCD camera, and the exposure time of the CCD camera is controlled by the computer; and the stroboscopic pulse LED light source is disposed to face the rotating model, and light emitted by the stroboscopic pulse LED light source is capable of covering a to-be-measured area; the stroboscopic pulse LED light source is connected to one end of a relay switch of the preset counter, and the other end of the relay switch of the preset counter is connected to the channel B of the signal generator; and the channel B of the signal generator sends a signal to control a single pulsed light emitting time and a light emitting frequency of the stroboscopic pulse LED light source.

2. A global pressure acquisition method for a rotating model, comprising the following steps:

step 1, providing the respective components of the global pressure acquisition system for the rotating model according to claim 1;

step 2, mounting the CCD camera and the stroboscopic pulse LED light source in a static state of the rotating model;

step 3, setting the stroboscopic pulse LED light source to continuously emit light, shooting an image I1 of the to-be-measured area in the static state by using the CCD camera in an automatic triggering manner, taking the image I1 as a reference image, sending the image I1 to the computer, and recording an exposure time T1 of the CCD camera at the moment by the computer;

step 4, turning on the photoelectric sensor, aligning the photoelectric sensor with the synchronously rotating non-measured area of the model, pasting the reflective patch to a model position where a light spot emitted by the photoelectric sensor reaches at the moment;

step 5, turning off the photoelectric sensor, adjusting the stroboscopic pulse LED light source to a modulated external triggering mode, sending a signal by the channel B of the signal generator to control the light emission of the stroboscopic pulse LED light source, and adjusting the CCD camera to the external triggering mode;

step 6, setting a signal pulse width t of the channel B of the signal generator, i.e., single light emitting time of the stroboscopic pulse LED light source, according to an experimental rotating speed n;

step 7, setting the number N of times of light emission of the stroboscopic pulse LED light source, setting the preset number of the preset counter to be N, and setting that exposure time T2 of the CCD camera is not shorter than the time during which the rotating model rotates for N circles;

step 8, turning on the rotating model, enabling a rotating speed of the rotating model to reach a measured rotating speed n, after the rotating model rotates to a phase in a static reference state, sending a triggering signal to the signal generator by the photoelectric sensor to control the CCD camera to start to expose and control the signal generator to trigger the stroboscopic pulse LED light source to start to emit light at the same time;

step 9, after blades of the rotating model rotate for N times, stopping the light emission of the stroboscopic pulse LED light source;

step 10, after the exposure time of the CCD camera reaches T2, outputting an experimental image I2 to the computer; and step 11, calculating a light intensity ratio of the two images, and calculating pressure distribution according to a light intensity-pressure calibration formula.

3. The global pressure acquisition method for the rotating model according to claim 2, wherein in step 2, when the CCD camera and the stroboscopic pulse LED light source are mounted, a position where the PSP is sprayed is adjusted so that the CCD camera is capable of shooting a complete area where the PSP is sprayed; and a measuring distance of the stroboscopic pulse LED light source is adjusted so that the emitted light is capable of covering the complete to-be-measured area.

4. The global pressure acquisition method for the rotating model according to claim 2, wherein in step 7, the number N of times of the light emission of the stroboscopic pulse LED light source satisfies N=T1/t, that is, a total light emitting time of the stroboscopic pulse LED light source in the experimental image is consistent with that of a static reference image.

5. The global pressure acquisition method for the rotating model according to claim 2, wherein in step 11, the light intensity-pressure calibration formula is expressed as:

$$I2/I1 = A + B \times P2/P1,$$

wherein P1 is an ambient pressure of the rotating model in the static state, P2 is a surface pressure of the rotating model in a motion state, and P1 and P2 are measured by a pressure sensor; and A and B are calibration coefficients which are constants.

6. The global pressure acquisition method for the rotating model according to claim 5, wherein the calibration coefficients A and B are acquired by using the following method: placing a sample wafer sprayed with PSP in a pressure-adjustable cabin, adjusting a pressure in the cabin to P1, and acquiring a light emitting image Ic of the PSP at the moment by a camera; repeatedly adjusting the pressure P in the cabin, and capturing a corresponding light emitting image I by the camera; substituting repeatedly-acquired data into a calibration formula I/Ic=A+B×P/P1 to form binary linear equations with variables A and B; and calculating A and B by a least square method.

* * * * *